United States Patent [19]

Marsh et al.

[11] 4,235,629

[45] Nov. 25, 1980

[54] METHOD FOR PRODUCING AN EMBRITTLEMENT-RESISTANT TANTALUM WIRE

[75] Inventors: Harold G. Marsh, Libertyville, Ill.; James A. Pierret, Muskogee, Okla.

[73] Assignee: Fansteel Inc., North Chicago, Ill.

[21] Appl. No.: 842,588

[22] Filed: Oct. 17, 1977

Related U.S. Application Data

[62] Division of Ser. No. 345,956, Mar. 29, 1973, Pat. No. 4,062,697.

[51] Int. Cl.$^3$ .......................... B22F 1/04; B22F 33/02
[52] U.S. Cl. ........................................ 75/211; 75/174; 75/200; 75/245
[58] Field of Search ................ 75/245, 174, 200, 211; 252/512

[56] References Cited

U.S. PATENT DOCUMENTS

| 3,243,290 | 3/1966 | Clark et al. ............................. 75/174 |
| 3,498,854 | 3/1970 | Buckman ................................ 75/174 |
| 3,592,639 | 7/1971 | Schussler et al. ...................... 75/174 |

OTHER PUBLICATIONS

*Metals Handbook*, 8th Ed., vol. #1, American Society for Metals, 1961, pp. 1222-1224, Section M.

*Primary Examiner*—Benjamin R. Padgett
*Assistant Examiner*—J. Lloyd Barr
*Attorney, Agent, or Firm*—Dressler, Goldsmith, Shore, Sutker & Milnamow, Ltd.

[57] ABSTRACT

Tantalum and tantalum-rich alloys, particularly in wire form, are stabilized against embrittlement by the addition of 50 to 700 parts per million of silicon and optionally with the further addition of 100 to 500 parts per million of carbon.

4 Claims, No Drawings

METHOD FOR PRODUCING AN EMBRITTLEMENT-RESISTANT TANTALUM WIRE

This is a division of application Ser. No. 345,956, filed Mar. 29, 1973 now U.S. Pat. No. 4,062,697.

BACKGROUND OF INVENTION

Several of the major applications for tantalum are in electrolytic capacitors and in furnace components in high temperature, vacuum furnaces. The properties of tantalum that makes it an attractive material for use in these applications include: high melting point, high dielectric constant in the tantalum oxide film formed by anodizing; high electrical conductivity; excellent ductility and fabricability; and availability in high purity forms.

It is known that tantalum is embrittled when exposed at relatively high temperatures (above 600° F.) for even short periods of time to certain gases and vapors. Oxygen, carbon monoxide, and carbon dioxide are notable examples of contaminating gases, and they are important since they comprise the products or reactants of many physical and chemical reactions involving the use of tantalum products, either directly or indirectly, in the electronics, metal and chemical industries. The above-described embrittlement condition refers to the loss of suitable ability to bend without breaking in the intended application (as observed and measured at or near room temperature) resulting from exposure of tantalum to high temperatures in unsuitable vacuums or in contaminating gases and vapors. The lack of low temperature ability to bend without breaking after contamination causes severe problems since fabricated parts of tantalum that have been contaminated are subsequently exposed to vibration, impact and static forces at or near room temperature during their life or during their manufacture into certain finished products or devices.

One of the major difficulties in the use of tantalum in electrolytic capacitors has been that tantalum lead wires often become severely embrittled during sintering of slug-type tantalum anodes produced by pressing and sintering of tantalum powder with the tantalum lead wire embedded in the powder slugs. The extent of embrittlement is known to be more severe when such tantalum lead wires are embedded in tantalum powders having a relatively high oxygen content, for example, more than 1600 parts per million.

One method that has been used as a means to attempt to overcome this difficulty has been to treat the surface of the tantalum lead wire with carbon or a carbonaceous material. The carbon coating tends to react with oxygen in the tantalum powder during the subsequent high-temperature sintering operation, and thus by this means the bendability of the lead wire is maintained because the oxygen has reacted with the carbon coating rather than being absorbed by the tantalum lead wire. With this method, however, it is difficult to control the application of carbon to obtain consistent behavior and maintain the necessary bendability in the lead wire. In addition, carbon on the surface of the wire exerts an adverse effect on the electrical properties of the tantalum by producing an undesired increase in DC leakage through the tantalum oxide dielectric film.

Still another method that has been used in an effort to lessen the extent of embrittlement of the tantalum lead wire is to use a grain-size-controlled tantalum lead wire; i.e., a tantalum wire that exhibits a grain size that does not grow significantly upon exposure to the elevated temperatures employed during sintering of the anodes. However, the grain size control lead wire does still not have the desired resistance to embrittlement in many instances, especially in those applications where the grain-size-controlled tantalum lead wire is embedded in a high-oxygen containing tantalum powder slug and especially where the oxygen content of the tantalum powder is 1600 ppm or higher.

The embrittlement of tantalum lead wires is a principal and major problem when handling anodes when they are welded to the anodizing rack. The embrittlement is most severe in the tantalum lead wire at a location adjacent to the high oxygen-containing powder where the anode lead wire or riser is embedded in the tantalum powder slugs. The principal embrittlement is noted at the point of egress of the wire from the sintered anode, where the oxygen content in the wire is high and where the wire is unsupported. The embrittlement of tantalum lead wires has a strong bearing on whether or not a capacitor manufacturing operation can be operated economically or not, because failure of the lead wires during handling can lead to a complete loss of the parts. Thus, all value added to the material through that stage of manufacturing is lost. A solution to the tantalum lead wire embrittlement problem has a strong bearing on making capacitor operations economical. Normally the embrittlement problem is most severe in tantalum capacitor anodes that are pressed and sintered from powders containing relatively high oxygen content (e.g., 1600 ppm oxygen or higher), and with powders sintered at temperatures of 1800° C. or higher.

Furthermore, embrittlement of wrought tantalum fabricated components in high temperature furnace or other high temperature applications can adversely affect life of the parts. Tantalum materials in high temperature applications are adversely affected because they are getters for gases such as carbon monoxide or dioxide, oxygen and nitrogen. Because of the high cost of fabricated tantalum parts, replacement of the parts because of embrittlement can cause lengthy down-time and result in a sizable replacement cost. Substantial economical benefits can be gained if the service life of such tantalum parts can be increased.

SUMMARY OF THE INVENTION

In accordance with this invention, the embrittlement of tantalum and tantalum-rich alloys is reduced by the addition of sufficient silicon to provide from about 50 to about 700 parts per million of silicon relatively uniformly distributed in the metal. In a preferred aspect of this invention there is also included sufficient carbon to provide from about 100 to about 500 parts per million of carbon in the metal.

The silicon-containing tantalum compositions of this invention are made by powder metallurgy pressing and sintering techniques and by first blending silicon into a master alloy blend of relatively high silicon content and then blending the master alloy blend into the total composition.

Typically, a finely divided silicon powder is blended with a finely divided tantalum powder in an amount to produce a nominal silicon concentration between about 1% and about 5% in the master blend. Since silicon volatilizes substantially more rapidly than tantalum and a portion of the silicon is lost during high temperature processing, the master blend is then mixed with finely divided tantalum powder in proportions to provide a nominal silicon content about 2 to 3 times as high as the actual silicon contend desired in the final composition. The final blend is then pressed and sintered to produce a dense bar and is then fabricated, as desired. For the fabrication of tantalum wire the bar is subjected to repeated cold rolling steps and then to repeated wire drawing steps until wire of the desired diameter is obtained.

The resistance to embrittlement achieved by this invention is demonstrated by an objective test run under conditions resembling actual use conditions. In this test, a test wire made in accordance with the invention is compared to a test wire made in accordance with prior practice with respect to the number of bends each wire can be subjected to before breaking. The details of the test are described below in connection with the specific examples.

EXAMPLE 1

A tantalum-silicon master alloy blend was prepared by blending 3 parts by weight of minus 200 mesh elemental silicon powder with 97 parts by weight of minus 325 mesh high purity tantalum powder. The blend was out-gassed in vacuum at 1325° C. for 3 hours, jaw crushed, milled and screened to minus 325 mesh. The above master blend and sodium-reduced tantalum powder were then mixed to provide a powder blend containing nominally 300 ppm silicon content. Approximately 14 lbs. of the powder blend were then isostatically pressed into a ⅞" by ⅞" by approximately 30" long rectangular cross section wire bar at a compacting pressure of 40,000 psi. The compacted bar was sintered by self-resistance heating to a temperature of 2380° C. for 3½ hours in vacuum, cooled under vacuum, repressed isostatically at 80,000 psi to increase the density of the bar, resintered again by direct resistance heating to a temperature of 2400° C. for 3½ hours in vacuum, and cooled under vacuum. The resulting double-sintered wire bar was analyzed with the following results:

| Chemical Composition: | | |
|---|---|---|
| Carbon | 16 | ppm |
| Oxygen | 55 | ppm |
| Nitrogen | 38 | ppm |
| Hydrogen | <5 | ppm |
| Columbium | 40 | ppm |
| Tungsten | 25 | ppm |
| Molybdenum | <10 | ppm |
| Iron | 100 | ppm |
| Nickel | 75 | ppm |
| Chromium | <10 | ppm |
| Calcium | 10 | ppm |
| Silicon | 150 | ppm |
| Hardness, Bhn: 66.8 to 71.5 | | |
| Density: 15.85 gms. per cu. cm. | | |

The ⅞" square-cross-section, double-sintered wire bar was cold-rolled to a 0.440-inch, round-cornered-square cross-section bar, which was degreased in perchlorethylene, acid pickled in a nitric-hydrofluoric-sulphuric acid solution to obtain a chemically clean surface, and vacuum annealed at 1300° C. for 60 minutes in vacuum at an absolute furnace pressure of 0.1 micron. The annealed 0.440-inch bar was then further cold-rolled to a 0.147-inch cross-section round-cornered square cross-section, at which size it was coiled. The coil was cleaned by degreasing followed by acid etching, as described above, and again annealed at 1300° C. for 60 minutes in vacuum. The 0.147-inch round-cornered square cross-section wire was then rolled using square roll passes to a 0.089-inch round-cornered square cross-section, and given a rounding pass in semi-round cross-section rolls to a 0.083-inch diameter. The 0.083-inch diameter wire was cleaned by degreasing and acid pickling, and then was vacuum annealed as described above. The 0.083-inch diameter wire was drawn to the final wire sizes using a proprietary wire drawing practice to final diameters of 0.025, 0.020, 0.016, and 0.014-inch diameters. The wire in all the finished diameters was given a light etch in a solution composed of 1300 ml. of 48% hydrofluoric acid, 450 ml. of 70% nitric acid, 600 ml. of 98% sulphuric acid and 2500 ml. of deionized water. Then the wires were annealed in vaccum for 60 min. at 1300° C.

The wire in each of the diameters was spooled and inspected for surface quality at a magnification of 10X to reveal the possible presence of any defects such as slivers, delaminations, pits, or other imperfections that could be detrimental to the quality of the wire.

In order to determine the resistance to embrittlement of the wire samples in a capacitor anode, a test was run under conditions designed to simulate the embrittlement of tantalum wire that can occur in anode manufacture. A total of five samples of each wire diameter were cut to lengths of approximately ¾", and the wires were pressed into cylindrical pellets of tantalum powder containing 2735 ppm oxygen. The wires were embedded to the depth of ⅛" in the anodes, which were 0.25" diameter, 0.35±0.10" height, and weighed 2.0 grams each. A reference standard wire (not containing any added silicon) whose performance had been previously established by the test procedures, was included in the tests with the test wire for comparison purposes. The tantalum powder was pressed in these anodes, without an added binder, to a density of 7.5 g/cc. The pressed anodes with the embedded lead wires were placed symmetrically onto sintering trays. Included in each sintering run along with the anodes containing the test wires were anodes made with the reference standard wire which contained no intentional addition of silicon. The anodes were sintered in vacuum in a cold wall furnace at an absolute pressure of $10^{-5}$ Torr for 30 minutes at a temperature of 2050°±10° C.

The lead wires in the sintered anodes were repeatedly bent at a point ⅛" above the point of egress of the anode. A ⅛" thick die with a hole in the center is placed over the lead wire and serves to control the position where the bend occurs in the bend test. The wires were bent over the ⅛" thick die to an angle of 90°, and then were bent back up again to the vertical position. This total motion is defined as one bend in the wire. Successive bends were made in a like manner, but the direction of force was rotated 60° between consecutive bends. The number of bends before the wires failed by breaking was determined. From the data, a bend ratio was calculated which compares the number of bends to failure for the test wire compared to that of the reference standard control wire of the same diameter tested under the same conditions. [For a satisfactory test, the number of bends obtained for the control wire should average in the range of 1-5 bends.] The table below compares the ratio of bends before break of the test wires of Example 1 with that of the control wire:

EXAMPLE 5

Seven kilograms of tantalum powder was blended with 300 ppm silicon, added in the form of −325 mesh tantalum silicon master alloy powder containing 3% of silicon. A sheet bar measuring approximately ½" thickness by 3" width by 36" length was isostatically pressed in a rectangular cross-section rubber mold. This bar was then sintered in vacuum, repressed isostatically, and then sintered a second time. The compacting pressures and conditions of sintering time and temperatures were the same as those used for the square bars prepared in the earlier examples and as described in detail in Example 1.

The double-sintered sheet bar was cold-rolled to 0.010" thick sheet, with appropriate intermediate anneals during processing. This sheet was compared to tantalum sheet made in a similar matter except without an addition of silicon. Tensile properties were determined over a range of temperatures on the silicon-containing sheet of this example compared to tantalum sheet not containing added silicon. The elongation in tension for the sample without added silicon increased with increasing temperature to a peak of about 93% at about 2500° C. and then dropped sharply to a level of about 58% to about 3000° C. In contrast, the sample containing the added silicon showed increasing elongation in tensions at temperatures up to about 3000° C., reaching a level of 100% at that temperature.

The ultimate tensile strength of the tantalum containing added silicon was also found to be superior to that of the tantalum without added silicon over the entire temperature range from 1000°–3000° F.

Corrosion test coupons of the silicon-containing tantalum of this example, and of tantalum without added silicon were exposed for 31 days at a temperature of 205° C. to 95% sulfuric acid. The weight losses were found to be:

Silicon-containing tantalum, $64 \times 10^{-4}$ gm/cm$^2$
Tantalum without added silicon, $75 \times 10^{-4}$ gm/cm$^2$ As may be seen from Example 5, the addition of small amounts of silicon to tantalum or to tantalum-rich alloys produces beneficial effects in addition to enhanced resistance to embrittlement and is useful in tantalum compositions even in those instances when they are fabricated for end uses in which excessive embrittlement may not be a problem.

In general, the invention contemplates the addition of from about 100 to about 2000 parts per million of silicon to tantalum or to a tantalum-rich composition containing at least 80 weight percent of tantalum to produce, after processing, a wrought product containing from about 50 to about 700 parts per million of silicon. A preferable range of silicon is from about 200 to about 900 parts per million in the initial composition, and from about 100 to about 300 parts per million in the final wrought product.

The tantalum-rich alloys with respect to which the invention is generally applicable are those containing at least 80 weight percent of tantalum. A particularly useful class of tantalum-rich alloys to which silicon may be added in accordance with this invention are those containing up to 14 weight percent of tungsten, and up to 3 weight percent of other alloying elements.

The silicon added in accordance with this invention need not be in the form of elemental silicon, as shown in the Examples. It may be added in the form of a silicon compound, such as tantalum silicide, or (if added carbon is also desired) silicon carbide.

It is to be noted, as illustrated in Example 3a, that the benefits of this invention with respect to resistance to embrittlement are obtained even when substantial amounts of impurities are present in the metal. However, the desire for optimum properties other than resistance to embrittlement may require relatively low limits to the amounts that can be tolerated of certain metallic impurities. For superior performances with respect to electrical characteristics in capacitor application, for example, it is desired to maintain the following impurities below the levels shown in the following table:

| Impurities | Level |
| --- | --- |
| Columbium | less than 300 ppm |
| Sum of iron, chromium, and nickel | less than 200 ppm |
| Tungsten | less than 50 ppm |
| Molybdenum | less than 10 ppm |
| Chromium | less than 30 ppm |
| Calcium | less than 20 ppm |

The method of this invention, as illustrated in the examples involves first making a silicon-containing master blend having a substantially higher silicon content than the silicon content of the desired final product by the blending of finely divided silicon into finely divided tantalum or a finely divided tantalum-rich alloy in the desired proportions for the master blend, followed by heating the blend to remove volatile impurities and then milling the blend to make it essentially uniform.

The master blend is then thoroughly mixed with tantalum or a tantalum-rich alloy in powdered form in proportions to provide from 2 to 3 times the amount of silicon desired in the final composition and the mixture is pressed and sintered one or more times before further processing.

The materials used in the preparation of the master blend should be finely divided to provide the desired substantial uniformity in the final product. Preferably, the materials should be sufficiently finely divided to pass through a 60 mesh screen, and most preferably, to pass through a 200 mesh screen.

The proportions of silicon in the master blend is not critical. Any proportion may be useful which provides for ease of handling in the creation of the final blend. A suitable range of silicon content in the master blend is from about 1% to about 5% by weight.

The temperature used in the preparation of the master blend for driving off volatile material is preferably held to a maximum of about 1500° C. to avoid partial sintering of the tantalum and the consequent difficulty in milling. However, temperatures above 1500° C. may be used if steps are taken to restore ease of milling to the product by hydriding the tantalum prior to the milling step.

In the above description, primary emphasis has been given to tantalum wire. The compositions of this invention are also useful in the preparation of sheet (Example 5), rod, and other wrought forms of tantalum, and particularly for the manufacture of tantalum heating elements, reflectors and other hardware for high temperature vacuum furnaces.

While the invention has been described with respect to particular embodiments it will be understood by those skilled in the art that modification and variations

| Wire Tested | Wire Diameter, Inch | Bend Ratio |
|---|---|---|
| Reference Control | 0.025 | 1.0 |
| Example 1 | .025 | 2.1 |
| Reference Control | .015 | 1.0 |
| Example 1 | .015 | 2.3 |

The test wires containing 150 ppm of silicon show a distinct and significant improvement in bend ratio over that of the reference standard wire which contained less than 10 ppm of silicon.

EXAMPLE 2

Experimental results on pressed and double-sintered bars to which various amounts of silicon were added in the form of a tantalum-3% silicon master alloy, as described in Example 1, established that the amount of silicon added to the bar to the amount retained after double-sintering was in the ratio of about 2:1 to 3:1. The reduction in silicon content in the bars is attributed to the volatilization of silicon monoxide which forms because of reaction between the silicon added and oxygen contained in the tantalum powder. Silicon monoxide is more volatile than elemental silicon at the temperatures utilized in processing the powdered tantalum. The major reduction in the silicon content was found to occur during the first sinter of the bar while it was still rather porous and permeable, thus allowing the escape of the silicon monoxide during the sinter at 2380° C. During the second sinter when the bar was approaching full density, silicon loss was insignificant.

In a series of additional tests a number of additional bars were prepared with various levels of silicon content. The silicon was added in the form of the above-described tantalum—3% silicon content master alloy in amounts to provide 80, 200, 300 (two bars), and 450 parts per million of added silicon. Bars were then prepared following the detailed procedure described under Example 1. Wire was drawn to 0.025" diameter. The resulting wire prepared from the 300 ppm samples was analyzed for retained silicon content and for other elements by emission spectrographic analysis. The results were as follows:

| Chemical Composition | |
|---|---|
| Silicon | 110 ppm |
| Carbon | 16 ppm |
| Columbium | 40 ppm |
| Iron | 100 ppm |
| Molybdenum | <10 ppm |
| Nickel | 75 ppm |
| Chromium | <10 ppm |

The wires with the various levels of added silicon were tested for bend ratio under the conditions described in detail in Example 1. The results were as follows:

| Added Silicon | Bend Ratio | (average of five tests) |
|---|---|---|
| 80 ppm | 1.5 | |
| 200 ppm | 1.4 | |
| 300 ppm (first sample) | 1.6, 2.1 | (two different wires) |
| 300 ppm (second sample) | 1.9, 2,4 | (two different wires) |
| 400 ppm | 2.1 | |

The foregoing data and other tests on a large number of samples indicate that the average bend ratio increases as the retained silicon level increases up to an average bend ratio of about 2.0 at silicon level of about 100 ppm. At higher retained silicon levels the average bend ratio remains at about the same level but the "scatter" of individual tests is decreased, providing greater assurance that a particular wire will have a bend ratio close to 2.0.

EXAMPLE 3

A series of five bars were prepared in which additions of both silicon and carbon were made. The silicon additions were made in the form of the tantalum—3% silicon content master alloy, as described under Example 1, while carbon was added in the form of −325 mesh tantalum carbide powder. These bars were pressed, double-sintered and subsequently drawn to 0.025" diameter wire by the same procedure as described under Example 1. Two of the wires were analyzed for silicon and carbon contents and the other three were completely analyzed. The following table lists the chemical compositions of the wires and shows the retained silicon and carbon contents of the wires as well as the bend ratios obtained:

| | Chemical Composition | | | | |
|---|---|---|---|---|---|
| | Example | | | | |
| | 3a | 3b | 3c | 3d | 3e |
| Silicon | 290 | 71 | 150 | 220 | 71 |
| Carbon | 115 | 77 | 130 | 208 | 150 |
| Columbium | 415 | | 60 | 290 | |
| Iron | 150 | | 150 | 150 | |
| Aluminum | 130 | | <10 | 130 | |
| Molybdenum | 150 | | <10 | <10 | |
| Nickel | 80 | | 190 | 170 | |
| Chromium | 50 | | 14 | <10 | |
| Tungsten | <10 | | <50 | <50 | |
| Bend Ratios | 1.9 | 2.2 | 2.1 | 2.2,2.5 | 2.2 |

EXAMPLE 4

One bar was prepared to which 300 ppm silicon was added in the form of a tantalum—3% silicon master alloy along with 200 ppm aluminum added as a tantalum—1% aluminum content master alloy. The bar was processed by pressing, sintering and wire drawing by the procedure described under Example 1. The chemical analysis of this wire showed that 170 ppm silicon and 90 ppm aluminum were retained in the wire. The bend ratio of the wire was found to be 1.8.

Another bar was prepared in which 150 ppm silicon was added as a tantalum—3% silicon master alloy, 100 ppm aluminum was added as a tantalum—1% aluminum master alloy, and 100 ppm carbon was added as −325 mesh tantalum carbide powder. The 0.025" diameter wire processed from the bar by the procedure described under Example 1 was found to contain 71 ppm silicon, 59 ppm aluminum and 71 ppm carbon. The bend ratio was found to be 2.4.

may be employed without departing from the scope of the invention.

What is claimed is:

1. The method of producing a tantalum metal resistant to embrittlement which comprises preparing a master blend of finely divided silicon and a finely divided metal of the group consisting of tantalum and tantalum-rich alloys containing at least about 80 weight percent of tantalum; blending said master blend with additional finely divided metal of said group in an amount to prepare a composition containing from about 100 to about 2000 parts per million of silicon; and thereafter pressing and sintering said composition to produce a compact shaped article having a silicon content of about 50 to about 700 parts per million.

2. The method of claim 1 wherein said finely divided metal comprises substantially pure tantalum.

3. The method of claim 1 wherein said silicon is added in an amount from about 200 to about 900 parts per million and said shaped article has a silicon content from about 100 to about 300 parts per million.

4. The method of claim 2 wherein said tantalum contains less than 300 parts per million of columbium, less than 50 parts per million of tungsten, less than 10 parts per million of molybdenum, less than 30 parts per million of chromium, less than 20 parts per million of calcium, and less than 200 parts per million of iron, chromium and nickel combined.

* * * * *